(12) United States Patent
Yamamoto et al.

(10) Patent No.: US 7,763,672 B2
(45) Date of Patent: Jul. 27, 2010

(54) RED COLORED FILM, RED COLORED COMPOSITION, COLOR FILTER AND LIQUID CRYSTAL DISPLAY DEVICE

(75) Inventors: Masayuki Yamamoto, Tokyo (JP); Akira Hirano, Tokyo (JP); Hideyo Tanaka, Tokyo (JP); Yusuke Iida, Tokyo (JP); Satoshi Ohkuma, Tokyo (JP); Koichi Minato, Tokyo (JP); Takeshi Itoi, Tokyo (JP); Hidesato Hagiwara, Tokyo (JP)

(73) Assignees: Toyo Ink Mfg. Co., Ltd., Tokyo (JP); Toppan Printing Co., Ltd., Tokyo (JP)

(*) Notice: Subject to any disclaimer, the term of this patent is extended or adjusted under 35 U.S.C. 154(b) by 355 days.

(21) Appl. No.: 11/476,939

(22) Filed: Jun. 29, 2006

(65) Prior Publication Data
US 2007/0202272 A1 Aug. 30, 2007

(30) Foreign Application Priority Data
Jul. 1, 2005 (JP) ............................ 2005-194306

(51) Int. Cl.
*C08K 7/00* (2006.01)

(52) U.S. Cl. ............... 523/220; 252/299.01; 252/363.5; 252/582; 252/586; 524/86; 524/87; 524/94; 524/104; 524/105; 524/464

(58) Field of Classification Search ....................... None
See application file for complete search history.

(56) References Cited

U.S. PATENT DOCUMENTS

| | | | | |
|---|---|---|---|---|
| 4,544,239 A | * | 10/1985 | Shone et al. ................. | 252/583 |
| 5,683,805 A | * | 11/1997 | Oita et al. .................... | 428/343 |
| 5,931,996 A | * | 8/1999 | Reisser et al. ................ | 106/404 |
| 5,942,559 A | * | 8/1999 | Voser et al. .................. | 523/115 |
| 6,231,661 B1 | * | 5/2001 | Hayashi et al. .............. | 106/456 |
| 6,455,208 B1 | * | 9/2002 | Yamashiki et al. ............. | 430/7 |
| 6,716,897 B2 | * | 4/2004 | Okutsu et al. ................. | 524/88 |
| 2001/0011110 A1 | * | 8/2001 | Hayashi et al. .............. | 523/212 |
| 2003/0089516 A1 | * | 5/2003 | Hattori et al. ................. | 174/66 |
| 2005/0131114 A1 | * | 6/2005 | Sunahara et al. ............. | 524/88 |

FOREIGN PATENT DOCUMENTS

| | | | | |
|---|---|---|---|---|
| DE | 2546266 A | * | 4/1977 | |
| EP | 997500 A1 | * | 5/2000 | |
| JP | 53059729 A | * | 5/1978 | |
| JP | 06281807 A | * | 10/1994 | |
| JP | 08109495 A | * | 4/1996 | |
| JP | 2001-220520 | * | 8/2001 | |
| TW | 416011 | | 12/2000 | |

OTHER PUBLICATIONS

Machine Translation of JP 08109495 A. Translated on Apr. 21, 2008.*
Special Chem. "Particle Size of Pigments," [online] [retrieved on Dec. 12, 2008]. Retrieved from: The Wayback Machine as seen Aug. 12, 2004.*

* cited by examiner

*Primary Examiner*—Vasu Jagannathan
*Assistant Examiner*—Robert C Boyle
(74) *Attorney, Agent, or Firm*—Nixon & Vanderhye P.C.

(57) ABSTRACT

A red-colored film in which when an elliptically polarized light is incident on the film in a direction 45° aslant from a normal line direction with respect to a surface of the film, a light transmitted through the film has an average amplitude transmittance ratio (av. tan $\Psi$) in a wavelength region of 575 to 635 nm, which satisfies the following equation (1):

Figure 1:
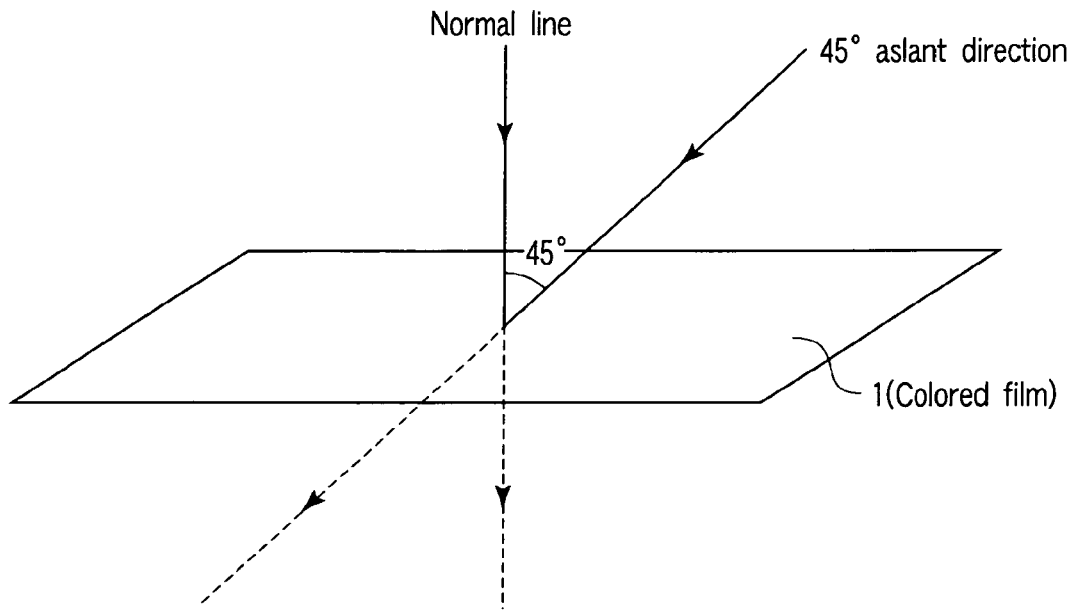

$$0.960 < \text{av. tan } \Psi < 1.040 \qquad (1).$$

A red-colored composition contains a red pigment A having a BET specific surface area in the range from 90 to 140 m²/g, a red pigment B having a BET specific surface area in the range from 70 to 85 m²/g, and a pigment carrier formed of a transparent resin, a precursor of the transparent resin or a mixture of the tarns parent resin and precursor thereof. A color filter has the red-colored film as a red color filter segment. The liquid crystal display device includes the color filter.

9 Claims, 1 Drawing Sheet

RED COLORED FILM, RED COLORED COMPOSITION, COLOR FILTER AND LIQUID CRYSTAL DISPLAY DEVICE

CROSS-REFERENCE TO RELATED APPLICATIONS

This application is based upon and claims the benefit of priority from prior Japanese Patent Application No. 2005-194306, filed Jul. 1, 2005, the entire contents of which are incorporated herein by reference.

BACKGROUND OF THE INVENTION

1. Field of the Invention

The present invention relates to a red-colored film having small optical anisotropy, in particular to a red-colored film having reduced anisotropy of amplitude transmittance in the directions of the film plane and film thickness perpendicular to the plane, respectively, and a red-colored composition suitably used for forming the red-colored film. The present invention also relates to a color filter and a liquid crystal display device using the red-colored film.

2. Description of the Related Art

Liquid crystal display devices have been valued for their space-saving, light weight and energy saving ascribed to their thin configuration, and applications of the display to a large-size television have been rapidly spreading. However, narrow viewing angle has been a great problem in conventional liquid crystal display devices.

Great factors affecting the viewing-angle dependency of the liquid crystal display device are birefringency of liquid crystal molecules and polarizer's own viewing-angle dependency.

Birefringency of the liquid crystal molecules refers to a difference in birefringences due to different crossing angles of elliptical refractive index of the liquid crystal molecule when the molecule is viewed frontally or aslant. To this problem, an improvement has been made for a most proven TN (twisted nematic) mode by disposing a retardation film, and has been also made in recent years by employing novel liquid crystal modes such as IPS (in-plane switching) mode and VA (vertical alignment) mode (Nakao and Wakemoto, Journal of Japanese Liquid Crystal Society, "Liquid Crystal", 2(7), 153 (2003)).

Viewing-angle dependency of the polarizer is due to leakage of light since, although the light is quenched when two orthogonally placed polarizes are frontally viewed, the crossing angle of polarizing light axes becomes larger than 90° when viewed aslant. Using two sheets of biaxial films has been proposed for solving this problem (Yamada and Yamahara, Journal of Japanese Liquid Crystal Society, "Liquid Crystal", 2(7), 184 (2003)).

However, higher level characteristics are required for making the screen size larger for use in televisions because, when a prospective angle increases, viewing-angle dependency is recognized as uneven color distribution on the screen.

Accordingly, suppression of viewing-angle dependency is being attempted with respect to components constituting the liquid crystal display other than the liquid crystal and polarizer. For example, it is proposed to reduce retardation by thinning the colored film with respect to the color filter that determines color characteristics of the liquid crystal display device (Jpn. Pat. Appln. KOKAI Publication No. 2000-136253).

However, since the red-colored film develops the color, unlike blue- and green-colored thin films, by transmission of the light near the slope at a longer wavelength side of the absorption band of the pigment contained in the film, anisotropy of the amplitude transmittance may be largely expressed by slight deviation of orientation and distribution of the pigment. Anisotropy of the amplitude transmittance becomes more evident in the red-colored film as the pigment is further finely divided for enhancing lightness and contrast ratio of the colored film. Accordingly, it has been a problem in a color filter comprising filter segments of red, blue and green colors that color leakage due to optical anisotropy of the red filter segment during black display causes color shift in a reddish direction.

BRIEF SUMMARY OF THE INVENTION

Accordingly, it is an object of the present invention to provide a red-colored film excellent in visibility in an aslant direction, and a red-colored composition for forming the red-colored film. It is another object of the present invention to provide a color filter excellent in visibility in an aslant direction, and a liquid crystal display device.

According to a first aspect of the present invention, there is provided a red-colored film in which when an elliptically polarized light is incident on the film in a direction 45° aslant from a normal line direction with respect to a surface of the film, a light transmitted through the film has an average amplitude transmittance ratio (av. tan Ψ) in a wavelength region of 575 to 635 nm, which satisfies the following equation (1):

$$0.960 < av.\ \tan \Psi < 1.040 \tag{1}$$

According to a second aspect of the present invention, there is provided a red-colored composition comprising a red pigment A having a BET specific surface area in a range of 90 to 140 m²/g, a red pigment B having a BET specific surface area in a range of 70 to 85 m²/g, a pigment carrier comprising a transparent resin, a precursor of the transparent resin or a mixture of the transparent resin and precursor thereof.

According to a third aspect of the present invention, there is provided a color filter comprising the red-colored film according to the present invention as a red color filter segment.

According to a fourth aspect of the present invention, there is provided a liquid crystal display device comprising the color filter according to the present invention.

BRIEF DESCRIPTION OF THE-SEVERAL VIEWS OF THE DRAWING

Figure 2:
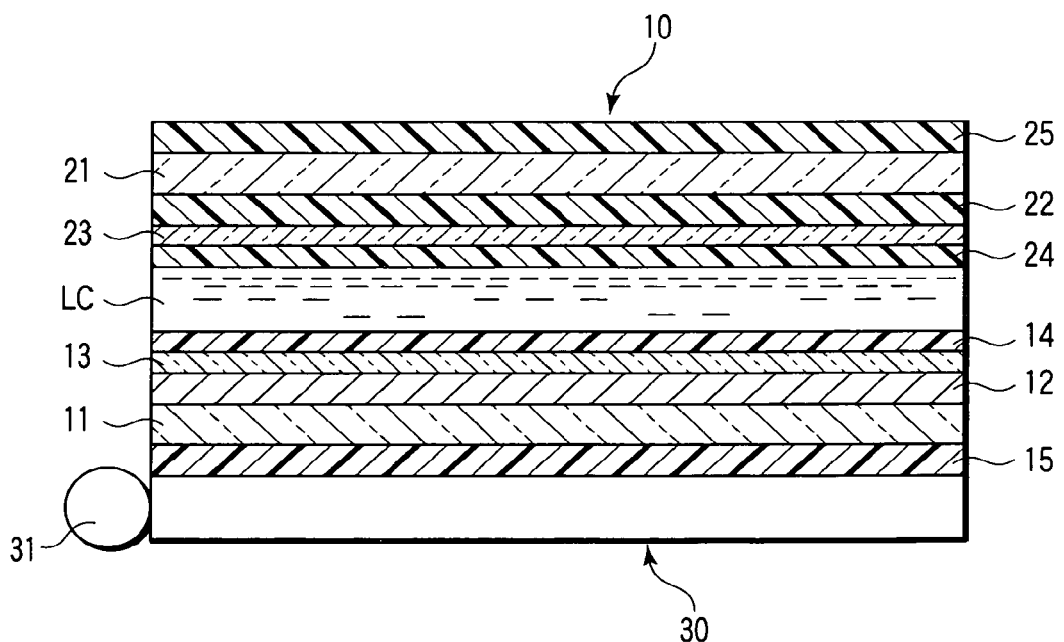

FIG. 1 is a schematic view illustrating the relation between the plane of a colored film and an incident direction of a light; and FIG. 2 is a cross-sectional view schematically illustrating an example of a liquid crystal display device comprising a color filter according to the present invention.

DETAILED DESCRIPTION OF THE INVENTION

A red-colored film according to the present invention will be described first.

In a red-colored film according to the present invention, when an elliptically polarized light is incident on the film in a direction 45° aslant from a normal line direction with respect to the plane of the film (hereinafter referred to as "45° aslant direction"), a light transmitted through the film has an average amplitude transmittance ratio (av. tan Ψ) in a wavelength region of 575 to 635 nm, the ratio satisfying the following equation (1):

$$0.960 < av.\ \tan \Psi < 1.040 \quad (1)$$

An amplitude transmittance ratio (tan Ψ) of the transmitted light exiting a colored film after allowing the elliptically polarized light to be incident on the colored film can be calculated from Ψ values measured using a transmission spectroscopic ellipsometer (trade name M-220, manufactured by JASCO Co.). Specifically, referring to FIG. 1, a red-colored film 1 is formed on a transparent substrate (not shown) such as a glass substrate. An elliptically polarized light is allowed to be incident on the red-colored film 1 in a normal line direction and a direction 45° aslant from the normal line direction to the plane of the colored film 1, and ellipso-parameters Ψ (referred to as Ψa) of the transmitted light exiting the red-colored film and transparent substrate are measured with the transmission spectroscopic ellipsometer. This measurement is performed for every 1 nm in a wavelength range of the transmitted light from 575 to 635 nm including the lower limit wavelength (575 nm) and upper limit wavelength (635 nm). Likewise, • values (referred to as Ψb) at the respective wavelengths noted above are also measured for the substrate (without the red-colored film). A Ψ value is calculated from the Ψa value (in ° unit) and Ψb value (in ° unit) by the following equation (A):

$$\Psi = \Psi a - (\Psi b - 45°) \quad (A)$$

A tangent value (tan Ψ) is calculated from the Ψ value obtained, and an average value thereof, or the average amplitude transmittance ratio (av. tan Ψ) is calculated. The Ψ value is 45° for a material having no anisotropy. The Ψb value is larger than 45° for the transparent glass substrate. Accordingly, a value of (Ψb−45°) should be subtracted as shown in the equation (A) when the Ψb value is subtracted as a blank value with respect to the transparent glass substrate.

The amplitude transmittance ratio (tan Ψ) is an indication of dichroism. A value of 1.00 of the tan Ψ value indicates no dichroism of transmittance, while a tan Ψ value increased or decreased from 1.00 indicates increased dichroism.

While tan Ψ in the direction of the normal line is about 1.00 for a colored film in which a pigment is dispersed, tan Ψ tends to depart from 1.00 as the incident direction of elliptically polarized light is aslant. In other words, while the film is isotropic in all the directions on the plane (film plane), the transmittance is different between the direction on the plane and the normal line direction (in the direction of thickness) to thereby exhibit dichroism. This phenomenon causes poor visibility in an aslant direction, and the difference of transmittance between the plane direction and normal line direction (in the direction of thickness) seems to be caused by distribution conditions of pigment particles contained in the colored film.

The red-colored film of the present invention is formed using a red-colored composition comprising a red pigment, a pigment carrier consisting of a transparent resin, a precursor of the transparent resin or a mixture of the transparent resin and the precursor of the transparent resin, and optionally a pigment derivative and an organic solvent.

An organic pigment or inorganic pigment is used alone, or a combination of a plurality of pigments can be used as the red pigment. The pigment preferably has high color developability and high heat resistance, particularly high resistance to heat decomposition. An organic pigment is usually used.

Examples of the red-colored organic pigment represented by color index numbers include Pigment Red (abbreviated as PR hereinafter) Nos. 7, 9, 14, 41, 48:1, 48:2, 48:3, 48:4, 81:1, 81:2, 81:3, 97, 122, 123, 146, 149, 168, 177, 178, 179, 180, 184, 185, 187, 192, 200, 202, 208, 210, 215, 216, 217, 220, 223, 224, 226, 227, 228, 240, 246, 254, 255, 264, 272 and 279. PR 254, one of diketopyrrole pigments, is most preferable for forming a highly bright color filter since its light stability, heat resistance and transparency are excellent. A yellow pigment and/or orange pigment may be used together in the red-colored film.

Examples of the yellow pigment include Pigment Yellow (abbreviated as PY hereinafter) Nos. 1, 2, 3, 4, 5, 6, 10, 12, 13, 14, 15, 16, 17, 18, 20, 24, 31, 32, 34, 35, 35:1, 36, 36:1, 37, 37:1, 40, 42, 43, 53, 55, 60, 61, 62, 63, 65, 73, 74, 77, 81, 83, 86, 93, 94, 95, 97, 98, 100, 101, 104, 106, 108, 109, 110, 113, 114, 115, 116, 117, 118, 119, 120, 123, 125, 126, 127, 128, 129, 137, 138, 139, 144, 146, 147, 148, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 213 and 214.

Examples of the orange pigment include pigment orange (abbreviated as PO hereinafter) Nos. 36, 43, 51, 55, 59, 61, 71 and 73.

The red pigment is preferably finely divided for attaining high lightness and high contrast ratio of the red-colored film. In particular, it is preferred to use a pigment A having a BET specific surface area in the range of 90 to 140 m$^2$/g, more preferably in the range of 90 to 110 m$^2$/g. While there is no problem on visibility in an aslant direction when only a red pigment with a specific surface area of smaller than 90 m$^2$/g is used, lightness and contrast ratio of the red-colored film becomes relatively low. On the other hand, when a red pigment having a specific surface area larger than 140 m$^2$/g is used, dispersion of the pigment is difficult and fluidity required for a colored composition can be hardly ensured, resulting in that characteristics of the red-colored film such as lightness and contrast ratio are deteriorated.

Dispersion of finely divided pigment particles is likely to be deviated. Accordingly, it is preferable to use particles having different sizes together in order to homogeneously disperse the particles. Specifically, it is preferred to add a red pigment B having a BET specific surface area in the range of 70 to 85 m$^2$/g, more preferably a red pigment B having a BET specific surface area in the range of 75 to 85 m$^2$/g is added to the red pigment A which attains high lightness and high contrast ratio of the red-colored film, in order to attain uniform particle dispersion. The red pigment B is used preferably in an amount of 10 to 60 parts by weight, more preferably in an amount of 20 to 50 parts by weight, relative to 100 parts by weight of the red pigment A. When the content of red pigment B is smaller than 10 parts by weight, the effect of making dispersion of the pigment A uniform is small. On the other hand, when the content of the red pigment B is larger than 60 parts by weight, contrast of the red-colored film tends to be remarkably decreased.

Methods for controlling the specific surface area of the pigment include: controlling the specific surface area by mechanically pulverizing the pigment (referred to as grinding method); allowing a pigment dissolved in a good solvent to precipitate by pouring the solution in a poor solvent to permit a pigment having a desired specific surface area to be precipitated (referred to as precipitation method); and producing a pigment having a desired specific surface area during a production process of the pigment (referred to as synthetic precipitation method). The specific surface area of the pigment may be controlled by selecting an appropriate method depending on the synthetic method and chemical properties of the pigment used. Each method will be described below.

The grinding method comprises the steps of: mechanically kneading the pigment with a grinding agent of a water-soluble inorganic salt such as sodium chloride and a water soluble organic solvent that does not dissolve the inorganic salt using a ball mill, sand mill or kneader (referred to as salt milling step); and obtaining a pigment having the desired specific surface area by removing the inorganic salt and the organic solvent by washing with water followed by drying. However, since the crystal of the pigment may grow by the salt milling step, it is effective for preventing the crystal from growing by adding a resin that is at least partly dissolved in the organic solvent or a pigment dispersant during the salt milling step. While the effect of pulverizing the pigment is improved as the proportion of the inorganic salt is increased, the proportion of the inorganic salt is usually in the range from 1 to 30 parts by weight, preferably in the range form 2 to 20 parts by weight, relative to 1 part by weight of the pigment, since increasing the proportion of the inorganic salt causes productivity to be decreased due to a relatively decreased amount of the pigment to be processed. The water soluble organic solvent is added so that the pigment and inorganic salt form a uniform dough, and the amount of addition of the organic solvent is usually in the range from 0.5 to 3 parts by weight relative to 1 part by weight of the pigment, although the proportion depends on the proportion of blending between the pigment and inorganic salt.

The salt milling step will be described in more detail. A small amount of the water soluble organic solvent as a lubricant is added to a mixture of the pigment and water soluble inorganic salt and, after strongly kneading the mixture with a kneader, the mixture is placed in water followed by stirring with a high speed mixer to form a slurry. Then, the slurry is filtered, and the filtrate is washed with water and dried to obtain a pigment having a desired specific surface area.

The precipitation method comprises the step of dissolving the pigment in an appropriate good solvent, and allowing a pigment having a desired specific surface area to precipitate by mixing the solution with a poor solvent. The specific surface area may be controlled by selecting the kind and amount of the solvent, precipitation temperature and precipitation speed. Although the solvent available is restricted since the pigment is hardly soluble in solvents, the solvents available include strongly acidic solvents such as conc. sulfuric acid, polyphosphoric acid and chlorosulfonic acid, and strongly basic solvents such as liquid ammonia and dimethylformamide solution of sodium methylate.

A representative example of the precipitation method is an acid pasting method, wherein a solution prepared by dissolving the pigment in an acidic solution is poured into another solvent to obtain fine particles by re-precipitation. Usually, a sulfuric acid solution is poured into water in an industrial process from the economical point of view. While the concentration of sulfuric acid is not particularly restricted, it is preferably in the range from 95 to 100% by weight. While the amount of use of sulfuric acid relative to the amount of the pigment is not particularly restricted, the amount is preferably in the range from 3 to 10 times by weight relative to the amount of the pigment, since handling performance becomes poor due to a high viscosity when the amount of use of sulfuric acid is too small, while processing efficiency of the pigment decreases when the amount is too large. The pigment is not necessarily dissolved completely in sulfuric acid. The dissolution temperature is preferably in the range from 0 to 50° C. Sulfuric acid may be frozen and low in solubility when the temperature is lower than 0° C., while side reactions may occur when the temperature is higher than 50° C. The temperature of water at which the sulfuric acid solution is poured is preferably in the range from 1 to 60° C. When the pouring operation is initiated at a temperature exceeding 60° C., the pouring operation is dangerous since boiling occurs by the heat of dissolution of sulfuric acid. The solution is frozen at a temperature lower than 1° C. The time required for pouring is preferably 0.1 to 30 minutes relative to 100 g of the pigment. The specific surface area tends to be reduced as the time required for pouring is longer.

Selecting a combination of a precipitation method such as the acid pasting method with a grinding method such as the salt milling method is preferable for controlling the specific surface area of the pigment, since the pigment can be controlled by taking dressing of the particles into consideration while fluidity as dispersion is ensured.

A dispersing aid such as a pigment derivative, a resin type dispersant and a surfactant may be used together for preventing the pigment from aggregating during control of the specific surface area by salt milling or acid pasting. When the specific surface area is controlled in the presence of two or more kinds of pigments, the pigments may be finished into a stable dispersion even when each pigment is difficult to be independently dispersed.

An example of special precipitation methods is a leuco method. Vat dyes such as flavanthrone dyes, perynone dyes, perylene dyes and indanthrone dyes become soluble in water by reducing with alkaline hydrosulfite since the quinone group is converted into a sodium salt of hydroquinone (a leuco compound). Pigments having a large specific surface area and insoluble in water may be precipitated by oxidizing an aqueous solution of the leuco dye by adding an appropriate oxidizing agent.

A pigment having a desired specific surface area is precipitated simultaneously with synthesizing the pigment in the synthetic precipitation method. However, since filtration as a usually used separation method is difficult unless the pigment particles form secondary particles by aggregation when fine pigment particles formed are isolated from the solvent, this method is usually applied for azo dyes synthesized in an aqueous system by which secondary aggregation readily occurs.

It is also possible to increase the specific surface area of the pigment while the pigment is dispersing by dispersing the pigment with a high speed sand mill (so-called dry grinding method) as a means for controlling the specific surface area of the pigment.

A pigment derivative is preferably added to the red-colored composition containing a red pigment and a pigment carrier, particularly to the red-colored composition containing a finely divided red pigment. While the finely divided pigment has a high aggregation power and readily exhibits optical anisotropy due to light scattering and deviation of pigment distribution, the pigment derivative not only serves as a dispersing aid but also suppresses crystal growth or aggregation of the pigment in the colored film.

The pigment derivative refers to a compound having substituents introduced into organic pigments. Examples of the organic pigment include diketopyrrolopyrrole pigments; azo pigments such as azo, bisazo or polyazo; and anthraquinone, quinacridone, perinone, perylene, isoindoline, isoindolinone, quinophthalone, threne and metal complex pigments. Examples of the organic pigment constituting the pigment derivative also include pale yellow compounds such as naphthalene and triazine compounds that are not usually defined as pigments.

The effect of the pigment derivative varies depending on the kind of the pigment. For example, the pigment derivative which has a structure of diketopyrrolopyrrole or quinacridone is preferable when diketopyrrolopyrrole pigments are used.

Examples of the substituent introduced into the organic pigment include those represented by the following formulae (2) to (6) below:

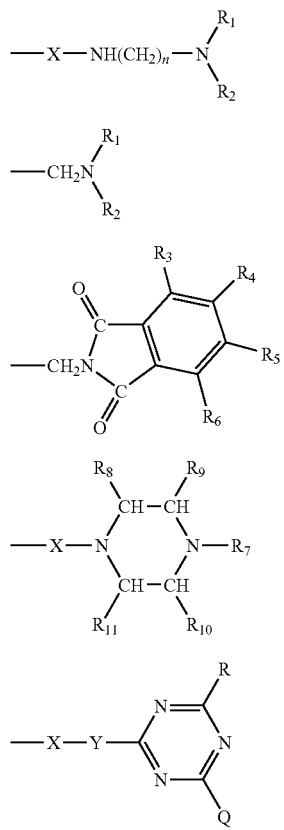

Formula (2)

Formula (3)

Formula (4)

Formula (5)

Formula (6)

In the formulae above, X represents —$SO_2$—, —CO—, —$CH_2NHCOCH_2$—, —$CH_2$— or a single bond, and n represents an integer of 1 to 10.

$R_1$ and $R_2$ each independently represents an alkyl group, an alkenyl group or an aryl group, which may be substituted, and $R_1$ and $R_2$ may be linked together to form a heterocyclic ring which may further contain a nitrogen, oxygen or sulfur atom, which may be substituted. The number of carbon atoms in the alkyl group and alkenyl group is preferably 1 to 10.

$R_3$, $R_4$, $R_5$ and $R_6$ each independently represents a hydrogen atom, a halogen atom, or an alkyl group, an alkenyl group, an aryl group, an aralkyl group, an alkoxy group, an aryloxy group, an alkylthio group, an arylthio group, an alkylamino group, a dialkylamino group, an arylamino group or a diarylamino group, which may be substituted. The number of carbon atoms in the alkyl group, the alkenyl group, the alkyl moiety of the alkylthio group, the alkyl moiety of the alkylamino group or the alkyl moiety of the dialkylamino group is preferably 1 to 10.

$R_7$ represents an alkyl group, an alkenyl group or an aryl group, which may be substituted. The number of carbon atoms in the alkyl group or the alkenyl group is preferably in 1 to 10.

$R_8$, $R_9$, $R_{10}$ and $R_{11}$ each independently represents a hydrogen atom, or an alkyl group, an alkenyl group or an aryl group, which may be substituted. The number of carbon atoms in the alkyl group or the alkenyl group is preferably 1 to 5.

Y represents —$NR_{12}$—Z—$NR_{13}$ or a single bond, where $R_{12}$ and $R_{13}$ each independently represents a hydrogen atom, or an alkyl group or an alkenyl group or a phenyl group, which may be substituted. The number of carbon atoms in the alkyl group or the alkenyl group is preferably 1 to 5.

Z represents an alkylene group, an alkenylene group or a phenylene group, which may be substituted. The number of carbon atoms in the alkylene or alkynylene group is preferably 1 to 8.

R represents a substituent represented by formula (7) or a substituent represented by formula (8), and Q represents a hydroxyl group, an alkoxy group, or a substituent represented by formula (7) or (8):

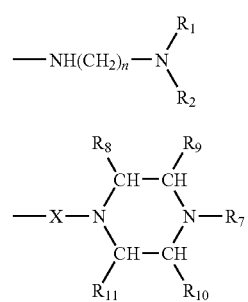

Formula (7)

Formula (8)

In formulae (7) and (8), $R_1$, $R_2$, $R_7$, $R_8$, $R_9$, $R_{10}$ and $R_{11}$ are as defined above.

The pigment derivative may be used alone, or as a mixture of plural derivatives.

When the pigment A is used alone as the red pigment, the content of the pigment derivative is preferably 15 to 30 parts by weight relative to 100 parts by weight of the red pigment A, wherein the amount of the pigment derivative includes the amount used for finely dividing the red pigment. The effect of suppressing crystal growth or aggregation of the red pigment is small when the content of the pigment derivative is smaller than 15 parts by weight, while fluidity of the red-colored composition cannot be maintained when the content exceeds 30 parts by weight. When the red pigment A and red pigment B are used together as the red pigment, the content of the pigment derivative is preferably 5 to 30 parts by weight relative to 100 parts by weight of the red pigments (A +B). When the red pigment having a specific surface area of less than 90 $m^2/g$ such as red pigment B is used alone as the red pigment, the content of the pigment derivative is preferably 5 to 20 parts by weight relative to 100 parts by weight of the red pigment.

While a pigment derivative having good dispersibility in vanish containing a pigment carrier is preferably selected, a dispersant other than the pigment derivative may be used together. As the dispersant other than the pigment derivative, use may be made of a so-called resin type dispersant such as a condensation product of ricinoleic acid or 12-hydroxystearic acid, a basic polymer compound, a copolymer containing an acid group, a fatty acid ester, and an aliphatic polyamine/polyester graft copolymer and a polyethylene/polypropylene addition polymer.

The pigment carrier contained in the red-colored composition comprises a transparent resin, its precursor or a mixture thereof. The transparent resin preferably has a light transmittance of 80% or more, more preferably 95% or more in the entire wavelength region of 400 to 700 nm of the visible light region. The transparent resin includes a thermoplastic resin, a thermosetting resin and a photosensitive resin, and a precursor of the transparent resin includes a monomer or oligomer that forms the transparent resin by being cured with radiation. These pigment carriers may be used alone, or in combination of two or more of these.

Examples of the thermoplastic resin include a butyral resin, a styrene-maleic acid copolymer, a chlorinated polyethylene, a chlorinated polypropylene, a polyvinyl chloride, a vinyl chloride-vinyl acetate copolymer, a polyvinyl acetate, a polyurethane resin, a polyester resin, an acrylic resin, an alkyd resin, a polystyrene, a polyamide resin, a rubber-based resin, a cyclized rubber-based resin, a cellulose derivative, a polyethylene, a polybutadiene and a polyimide resin.

Examples of the thermosetting resin include an epoxy resin, a benzoguanamine resin, a rosin-modified maleic acid resin, a rosin-modified fumaric acid resin, a melamine resin, a urea resin and a phenolic resin.

As the photosensitive resin, use may be made of a resin prepared by allowing a linear polymer having a reactive substituent such as a hydroxyl group, a carboxyl group or an amino group to react with a (meth)acrylic acid having a reactive substituent such as an isocyanate group, an aldehyde group or an epoxy group, or with cinnamic acid to introduce photocrosslinkable groups such as (meth)acryloyl group or styryl group into the linear polymer. Alternatively, a half-esterified compound prepared by allowing a liner polymer containing an acid anhydride, such as a styrene-maleic anhydride copolymer or an α-olefin-maleic anhydride to be half-esterified with a (meth)acrylic compound containing a hydroxyl group, such as hyrdoxyalkyl(meth)acrylate.

The content of the transparent resin is preferably 5 to 350 parts by weight relative to 100 parts by weight of the total amount of the red pigments.

Examples of the monomer and oligomer that form the transparent resin by being cured with radiation include various acrylates and methacrylates such as methyl (meth)acrylate, ethyl (meth)acrylate, 2-hydroxyethyl (meth)acrylate, 2-hydroxypropyl (meth)acrylate, cyclohexyl (meth)acrylate, β-carboxyethyl (meth)acrylate, diethyleneglycol di(meth)acrylate, 1,6-hexanediol di(meth)acrylate, triethyleneglycol di(meth)acrylate, tripropyleneglycol di(meth)acrylate, trimethylolpropane tri(meth)acrylate, pentaerythritol tri(meth)acrylate, 1,6-hexanediol diglycidylether di(meth)acrylate, bisphenol A diglycidylether di(meth)acrylate, neopentylglycol diglycidylether di(meth)acrylate, dipentaerythritol hexa (meth)acrylate, tricyclodecanyl(meth)acrylate, (meth)acrylate of methylolated melamine, epoxy(meth)acrylate and urethane acrylate; (meth)acrylic acid, styrene, vinyl acetate, hydroxyethyl vinylether, ethyleneglycol divinylether, pentaerythritol trivinylether, (meth)acrylamide, N-hydroxymethyl(meth)acrylamide, N-vinylformamide and acrylonitrile. These compounds may be used alone, or in combination.

The content of the monomer and oligomer is preferably 10 to 300 parts by weight, more preferably 10 to 200 parts by weight, relative to 100 parts by weight of the total amount of the red pigment.

When the red-colored composition is formed into a film by curing with radiation, a photopolymerization initiator is added to the red-colored composition. Examples of the photopolymerization initiator include acetophenone compounds such as 4-phenoxydichloroacetophenone, 4-t-bytyldichloroacetophenone, diethoxy acetophenone, 1-(4-isopropylphenyl)-2-hydroxy-2-methylpropan-1-one, 1-hydroxychlorohexylphenyl ketone and 2-benzyl-2-dimethylamino-1-(4-morpholinophenyl)-butan-1-one; benzoin compounds such as benzoin, benzoin methylether, benzoin ethylether, benzoin isopropylether and benzyldimethyl ketal; benzophenone compounds such as benzophenone, benzoylbenzoic acid, methyl benzoylbenzoate, 4-phenylbenzophenone, hydroxybenzophenone, acrylated benzophenone, 4-benzoyl-4'-methyldiphenyl sulfide and 3,3'4,4'-tetra(t-butylperoxycarbonyl) benzophenone; thioxanthone compounds such as thioxanthone, 2-chlorothioxanthone, 2-methylthioxanthone, isopropylthioxanthone, 2,4-diisopropylthioxanthone and 2,4-diethylthioxanthone; triazine compounds such as 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-pyperonyl-4,6-bis(trichloromethyl)-s-triazine, 2,4-bis(trichloromethyl)-6-styryl-s-triazine, 2-(napht-1-yl)-4,6-bis(trichloromethyl)-s-triazine, 2-(4-methoxynaphth-1-yl)-4,6-bis(trichloromethyl)-s-triazine, 2,4-trichloromethyl-(piperonyl)-6-triazine and 2,4-trichloromethyl(4'-methoxystyryl)-6-triazine; oxime ester compounds such as 1,2-octanedione, 1-[4-(phenylthio)-2-(O-benzoyloxime)], O-(acetyl)-N-(1-phenyl-2-oxo-2-(4'-methoxynaphthyl)-ethylidene)hydroxylamine; phosphine compounds such as bis(2,4,6-trimthylbenzoyl)phenylphosphine oxide and 2,4,6-trimethylbenzoyl diphenylphosphine oxide; quinone compounds such as 9,10-phenanthlene quinone camphor quinone and ethyl anthraquinone; borate compounds; carbazole compounds; imidazole compounds; and titanocene compounds. These compounds may be used alone, or in combination. The content of the photo-polymerization initiator is preferably 5 to 200 parts by weight, more preferably 10 to 150 parts by weight, relative to 100 parts by weight of the total amount of the red pigments.

A sensitizer may be added to the photopolymerization initiator. Examples of the sensitizer include amine compounds such as triethanolamine, methyldiethanolamine, triisopropanolamine, methyl 4-dimethylaminobenzoate, ethyl 4-dimethylaminobenzoate, isoamyl dimethylaminobenzoate, 2-dimethylaminoethyl benzoate, 2-ethylhexyl 4-dimethylaminoethyl benzoate, N,N-dimethyl paratoluidine, 4,4'-bis(dimethylamino)benzophenone, 4,4'-bis(diethylamino) benzophenone and 4,4'-bis(ethylmethylamino) benzophenone. These sensitizers may be used alone, or in combination. The content of the sensitizer is preferably 0.1 to 60 parts by weight relative to 100 parts by weight of the total amount of the red pigments.

A polyfunctional thiol compound that functions as a chain transfer agent may be added to the red-colored composition. The polyfunctional thiol may be a compound having a plurality of thiol groups. Examples of the compound include hexane dithiol, decane dithiol, 1,4-butanediol bisthiopropyonate, 1,4-butanediol bisthioglycolate, ethyleneglycol bisthioglycolate, ethyleneglycol bisthiopropionate, trimethylolpropane tristhioglycolate, trimethylolpropane tristhiopropyonate, trimethylolpropane tris(3-mercaptobutylate), pentaerythritol tetrakisthioglycolate, pentaerythritol tetrakisthiopropionate, trimercaptopropionic acid tris(2-hydroxyethyl)isocyanulate, 1,4-dimethylmercapto benzene, 2,4,6-trimercapto-s-triazine and 2-(N,N-dibutylamino)-4,6-dimercapto-s-triazine. One of these compounds may be used alone, or a plurality of them may be mixed for use. The content of the compound is preferably 0.05 to 100 parts by weight, more preferably 0.1 to 60 parts by weight, relative to 100 parts by weight of the total amount of the red pigments.

Various solvents may be added to the red-colored composition as in general use colored compositions for color filters in order to sufficiently disperse the red pigment for coating on a glass substrate so that the thickness of the dry film is in the range from 0.2 to 5 Jim. Examples of the solvent include cyclohexanone, ethyl cellosolve acetate, butyl cellosolve acetate, 1-methoxy-2-propyl acetate, diethyleneglycol dimethylether, ethylbenzene, ethyleneglycol diethylether, xylene, ethyl cellosolve, methyl n-amylketone, propyleneglycol monomethylether, toluene, methylethyl ketone, ethyl acetate, methanol, ethanol, isopropyl alcohol, butanol, isobutyl ketone and petroleum base solvents. One of these solvents may be used alone, or a plurality of them may be mixed for use. The content of the solvent is preferably in the range from 800 to 4000 parts by weight, more preferably from 1000 to 2500 parts by weight, relative to 100 parts by weight of the total amount of the red pigments.

The red-colored composition can be prepared by finely dispersing the red pigment, preferably the finely divided red pigment, in the transparent resin and/or a precursor thereof using various dispersion means such as a three-roll mill, two-roll mill, sand mill, kneader and attritor. A dispersion aid such as a resin type pigment dispersant, surfactant and pigment derivative may be added for successfully dispersing the red pigment. Since the dispersion aid is excellent in. dispersibility of the pigment and efficiently prevents the pigment after dispersion from being agglomerated again, a red-colored film superior in transparency may be obtained by using the red-colored composition in which the red pigment is dispersed in the transparent resin and/or precursor thereof using the dispersion assistant.

Examples of the surfactant include anionic surfactants such as polyoxyethylene alkylether sulfate, sodium dodecylbenzene sulfate, alkali salts of styrene-acrylate copolymer, sodium alkylnaphthalene sulfonate, sodium alkyldiphenylether disulfonate, monoethanolamine laurylsulfate, triethanolamine laurylsulfate, ammonium laurylsulfate, monoethanolamine stearate, sodium stearate, sodium laurylsulfate, monoethanolamine salt of styrene-acrylic acid copolymer and polyoxyethylene alkylether phosphoric acid ester; nonionic surfactants such as polyoxyethylene oleyl ether, polyoxyethylene lauryl ether, polyoxyethylene nonylphenyl ether, polyoxyethylene alkyl ether phosphoric acid ester, polyoxyethylene sorbitan monostearate and diethyleneglycol monolaurate; cationic surfactants such as alkyl quaternary ammonium slats and ethyleneoxide adduxts thereof; and amphoteric surfactants such as alkyl betaine such as alkyldimethylamino acetic acid betain and alkylimidazoline. One of these surfactants may be used alone, or a mixture of a plurality of them may be used.

A storage stabilizer may be added to the red-colored composition for stabilizing the viscosity of the composition over time. An adhesion improving agent such as silane coupling agents may be also added for enhancing adhesiveness of the film to the transparent substrate. Examples of the storage stabilizer include quaternary ammonium chloride such as benzyltrimethyl chloride and diethyl hydroxylamine, organic acids such as lactic acid and oxalic acid and methyl esters thereof, t-butylpyrocatechol; organic phosphine such as tetraethyl phosphine and tetraphenyl phosphine; and phosphorous acid salts.

Examples of the silane coupling agent include vinylsilane such as vinyltris(β-methoxyethoxy)silane, vinylethoxy silane and vinyltrimethoxy silane; (meth)acryl silane such as γ-methacryloxypropyl trimethoxysilane; epoxy silane such as β-(3,4-epoxycyclohexyl)ethyl trimethoxysilane, β-(3,4-epoxycyclohexyl)methyl trimethoxysilane, β-(3,4-epoxycyclohexyl)ethyl triethoxysilane, β-(3,4-epoxycyclohexyl)methyl triethoxyslilane, γ-glycidoxypropyl trimethoxysilane and γ-glycidoxypropyl triethoxysilane; aminosilane such as N-β-(aminoethyl)-γ-aminopropyl trimethoxysilane, N-β-(aminoethyl)-γ-aminopropyl triethoxysilane, N-β-(aminoethyl)-γ-aminopropylmethyl diethoxysilane, γ-aminopropyl triethoxysilane, γ-aminopropyl trimethoxysilane, N-phenyl-γ-aminopropyl trimethoxysilane and N-phenyl-γ-aminopropyl triethoxysilane; and thiosilane such as γ-mercaptopropyl trimethoxysilane and γ-mercaptopropyl triethoxysilane.

The red-colored composition may be prepared in a form of a gravure offset printing ink, a waterless offset printing ink, a silk screen printing ink, or a solvent developing type or an alkali developing type colored resist. The colored resist is prepared by dispersing the red pigment in a composition comprising a thermoplastic resin, thermosetting resin or photosensitive resin, a monomer, a photopolymerization initiator and an organic solvent. The red pigment is added preferably in a proportion in the range from 5 to 70% by weight, more preferably from 20 to 50% by weight, based on the total solid fraction of the red-colored composition with a balance substantially comprising a resinous binder provided from the transparent resin and/or a precursor thereof.

Coarse particles with a diameter of 5 μm or more, more preferably 1 μm or more, more preferably 0.5 μm or more and further preferably 0.2 μm or more, and mingled dusts are preferably removed from the red-colored composition by means of centrifugation, sintered filter or membrane filter.

The color filter of the present invention will be described below.

The color filter of the present invention comprises a red filter segment composed of the red-colored film of the present invention, green filter segment and blue filter segment, on a transparent substrate. The thickness of each filter segment is preferably in the range from 0.2 to 5 μm.

While the red filter segment in the color filter of the present invention has an average amplitude transmittance ratio (av. tan Ψ) satisfying above-mentioned equation (1) in the wavelength region from 575 to 635 nm, each of the green filter segment and blue filter segment has no optical characteristics that disturb polarized state in the wave length range from 535 to 560 nm for the green color and from 410 to 520 nm for the blue color. This means that the average amplitude transmittance ratio (av. tan Ψ) preferably satisfies above-mentioned equation (1) in the above-mentioned wavelength range.

The filter segment of each color can be formed on the transparent substrate by printing or photolithography. The red color segment is formed using the red-colored composition described above, and the green filter segment and blue color segments are formed using known green-colored composition and blue-colored composition, respectively, containing a green pigment and blue pigment, in place of the red pigment in the red-colored composition described above.

A glass plates such as a soda-lime glass, low-alkali borate glass or non-alkali aluminoborate glass, and resin plates such as polycarbonate, methyl polymethacrylate or polyethylene phthalate may be used as the transparent substrate. A transparent electrode made of indium oxide or tin oxide may be formed on the surface of the glass plate or resin plate for driving the liquid crystal after forming into a panel.

Examples of the green pigment used for the green-colored composition include Pigment Green (abbreviated as PG hereinafter) 7, 10, 36 and 37. The yellow pigment may be used together.

Examples of the blue pigment used for the blue-colored composition include Pigment Blue (abbreviated as PB) 15, 15:1, 15:2, 15:3, 15:4, 15:6, 16, 22, 60, 64 and 80. Violet pigments such as Pigment Violet (abbreviated as PV) 1, 19, 23, 27, 29, 30, 32, 37, 40, 42 and 50 may be used together.

These green pigment, yellow pigment, blue pigment and violet pigment are preferably pulverized as the red pigment is for attaining high lightness and high contrast of each colored film while they have a high specific surface area.

Each color filter segment is formed with a low production cost and good productivity by printing as a production method of the color filter, since the segment can be patterned merely by repeating printing and drying of the colored composition prepared as each printing ink. Moreover, fine patterns having high dimensional accuracy and smoothness can be printed thanks to development of printing technologies. The composition is preferably adjusted for printing such that the ink is not dried and solidified on a printing plate or blanket. Control of fluidity of the ink on a printing machine is also important, and the viscosity of the ink can be adjusted using a dispersant and an extender pigment.

When each color filter segment is formed by photolithography method, the colored composition prepared as a solvent developing type or alkali developing type colored resist is applied on the transparent substrate using an application means such as spray coating, spin coating, slit coating or roll coating such that the thickness of the dry film is in the range from 0.2 to 10 µm. A vacuum drier, a convection oven, an IR oven or a hot plate may be used for drying the coated film. The dry film which has been dried if necessary may be exposed to UV light through a mask having a predetermined pattern provided in contact or non-contact with the film. Non-cured portions are removed thereafter by immersing in or by spraying a solvent or an alkali developer to form a desired pattern, and the same operation is repeated for remaining colors to form respective color filters. The color filter may be heated, if necessary, for accelerating polymerization of the colored resists. A higher precision color filter may be produced by the photolithography method than by the above-mentioned printing method.

While an aqueous solution of sodium carbonate or sodium hydroxide is used as an alkali developer for development, an organic alkali such as dimethylbenzyl amine and triethanol amine may also be used. An anti-foaming agent and a surfactant may be added to the developer. Development methods available include shower development, spray development, dip (immersion) development and paddle (liquid laying) development. For enhancing sensitivity to UV exposure, a water soluble or an aqueous alkali solution-soluble resin, for example polyvinyl alcohol or water soluble acrylic resin, may be applied and dried in order to form a film for preventing the resist from being polymerized with oxygen before exposing the film to UV light.

The color filter of the present invention can be produced by electrodeposition method or transferring method in place of the above-described methods. The electrodeposition method is a method of, by utilizing a transparent electrically conductive film formed on a transparent substrate, preparing a color filter by electrodeposition-forming each color filter segment on the transparent electrically conductive film by electrophoresis of colloid particles. Further, the transferring method is a method of forming a color filter layer on the surface of a peelable transfer base sheet in advance, and transferring the color filter layer onto a desired transparent substrate.

The liquid crystal display device comprising the color filter of the present invention will be described below.

FIG. 2 is a schematic cross section of a liquid crystal display device comprising the color filter of the present invention. The device 10 shown in FIG. 2 is a representative example of a TFT addressing liquid crystal display device of a notebook personal computer. The device comprises a pair of transparent substrates 11 and 21 opposedly disposed with a space between them, and a liquid crystal (LC) is sealed in the space between the substrates. The liquid crystal (LC) may be oriented according to addressing modes such as TN (twisted nematic), STN (super twisted nematic), IPS (in-plane switching), VA (vertical alignment) and OCB (optically compensated birefringence) modes.

A TFT (thin film transistor) array 12 is formed on the inner face of the first transparent substrate 11, and a transparent electrode layer 13 made of, for example, ITO is formed thereon. An orientation layer 14 is formed on the transparent electrode layer 13. A polarizer 15 is formed on the outer surface of the transparent substrate 11.

On the other hand, a color filter 22 according to the present invention is formed on the inner face of the second transparent substrate 21. The red, green and blue filter segments constituting the color filter 22 are separated to one another with black matrices (not shown). A transparent protective layer (not shown) is formed, if necessary, so as to cover the color filter 22, a transparent electrode layer made of ITO is formed thereon, and an orientation layer 24 is formed so as to cover the transparent electrode layer 23. A polarizer 25 is formed on the outer surface of the transparent substrate 21. A backlight unit 30 comprising three wavelength lamps 31 is provided under the polarizer 15.

The present invention will be described more specifically by way of Examples and Comparative Examples below, but the present invention should not be restricted to the Examples below. "Parts" mean "parts by weight" and "%" means "% by weight" in the following

EXAMPLES AND COMPARATIVE EXAMPLES

Various properties were measured by the following methods in the Examples below.

<Method for Measuring the Properties>

[Specific Surface Area]

The specific surface area was measured by a BET method based on nitrogen adsorption, using an automatic vapor adsorption measuring apparatus ("BELSORP 18", manufactured by Nippon Bell Co.).

[Chromaticity]

Chromaticity (Y, x, y) under C-light source was measured using a microscopic spectrophotometer ("OSP-SP100", manufactured by Olympus Optics Co.).

[Film Thickness]

Thickness of the film was measured using a stylus profiler ("Dektak 8", manufactured by Japan Veeco Co.).

[Contrast Ratio]

Polarizers were placed on both surfaces of a substrate on which a colored film was formed such that the polarizing axes of both polarizers were parallel to one another, backlight was incident from one of the polarizer sides, and luminance (Lp) of the light permeating through the other polarizer was measured with a luminance meter. Then, the polarizers placed on both surfaces of the substrate were aligned such that the polarizing axes of both polarizers were perpendicular to one another. The backlight was incident from one of the polarizer sides, and luminance (Lc) of the light permeating through the other polarizer was measured with a luminance meter. The contrast ratio Lp/Lc was calculated using the measured luminance values obtained. Luminance was measured in the direction of the normal line of the substrate. Two polarizers used were "NPF-SEG 1224 DU" manufactured by Nitto Denko Co. The luminance meter used was "BM-5A" manufactured by Topcon Co., and the luminance was measured under a condition of 2° field of view.

[Average Amplitude Transmittance Ratio (av. tan Ψ)]

[Average Amplitude Transmittance Ratio (av. tan Ψ)]

Elliptically polarized light was incident on a substrate on which a colored film was formed from the direction of the normal line of the substrate and from 45° aslant direction, and ψa value of the transmitted light was measured using a transmission spectroscopic ellipsometer ("M-220" manufactured by JASCO Co.). The value was measured for every 1 nm in the wavelength region from 575 to 635 nm for the red-colored film, in the wavelength region from 410 to 520 nm for the blue-colored film, and in the wavelength region from 535 to 560 nm for the green-colored film. The ψb value for the transparent glass substrate alone, which had supported the colored film, was also measured. The ψ value was calculated according to above-mentioned equation (A), a tangent value (tan ψ) was calculated therefrom, and an average value thereof, or an average amplitude transmittance ratio (av. tan Ψ) was calculated.

[Color Characteristics on a Black Display Screen of the Liquid Crystal Display Device]

A black screen was displayed on the liquid crystal display device, and colored states on this black display screen were evaluated by visual observation in the direction 45° aslant to the screen. The evaluation rank was as follows:

○: good visibility without coloring

×: poor visibility with coloring

The pigment derivatives used in the following Production examples were as follows:

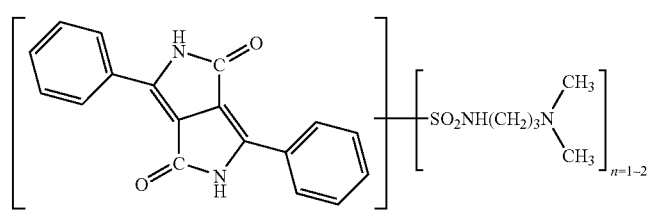

D-1

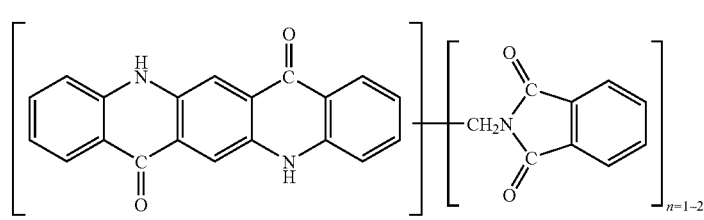

D-2

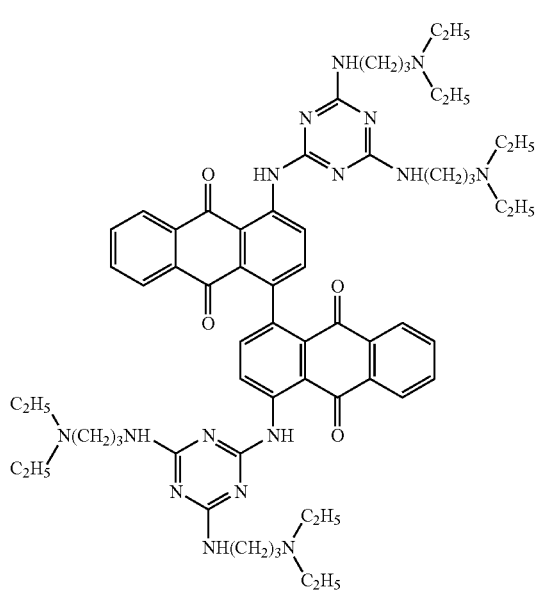

D-3

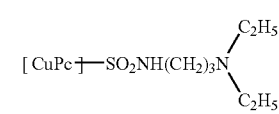

D-4

CuPc: copper phthalocyanine residue

-continued

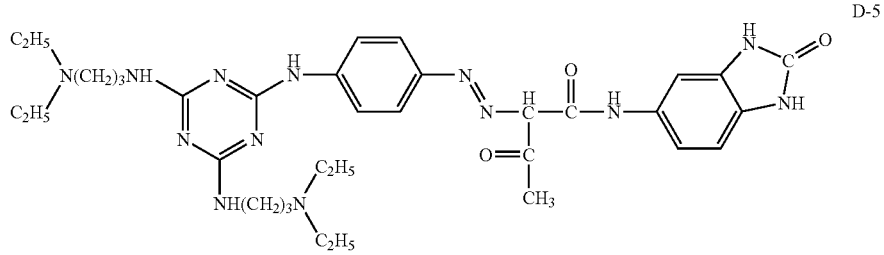

D-5 a) Preparation of Finely Divided Pigment

Production Example 1

After placing 300 parts of red pigment PR 254 ("IRGAZIN DPP RED BO", manufactured by Ciba Specialty Chemicals Co.) in 3000 parts of 96% sulfuric acid with stirring for 1 hour, the solution was poured into water at 5° C. After stirring the solution for 1 hour, the solution was filtered, and the filter was washed with warm water until the washings became neutral, followed by drying the filtered product at 70° C. 152 parts of the acid-pasted pigment thus obtained, 8 parts of the pigment derivative (D-1), 1600 parts of sodium chloride and 190 parts of diethyleneglycol (manufactured by Tokyo Kasei Co. as a solvent were placed in a one-gallon stainless steel kneader, and the mixture was kneaded at 60° C. for 10 hours. The mixture was poured into 3 liters of warm water, and was stirred for about 1 hour with a high speed mixer while heating at 80° C., to prepare a slurry. The slurry was repeatedly filtered and washed with water to remove sodium chloride and solvent (diethyleneglycol), followed by drying at 80° C. for 24 hours to prepare 156 parts of salt milled pigment R-1. The specific surface area of salt milled pigment R-1 was 92 $m^2/g$. This salt milled pigment contained 148 parts of red pigment A and 7.8 parts of the pigment derivative (95% by weight of red pigment A and 5% by weight of the pigment derivative).

Production Example 2

Salt milled pigment (R-2) was obtained by the same procedure as in Production Example 1, except that pigment derivative (D-2) was used in place of pigment derivative (D-1). The specific surface area of salt milled pigment (R-2) was 95 $m^2/g$. This salt milled pigment R-2 contained 95% of red pigment A and 5% of the pigment derivative.

Production Example 3

Salt milled pigment (R-3) was obtained by the same procedure as in Production Example 1, except that the amount of the acid pasted pigment used on salt milling was changed from 152 parts to 144 parts, and the amount of pigment derivative (D-1) was changed from 8 parts to 16 parts. The specific surface area of salt milled pigment (R-3) was 102 $m^2/g$. This alt milled pigment R-3 contained 90% of red pigment A and 10% of the pigment derivative.

Production Example 4

200 parts of blue pigment PB 15:6 ("LINOL BLUE ES", manufactured by Toyo Ink Mfg. Co.), 1600 parts of sodium chloride and 100 parts of diethyleneglycol were placed in a one-gallon stainless steel kneader, and the mixture was kneaded at 70° C. for 12 hours. This mixture was poured into 5 liters of warm water, and was stirred for about 1 hour with a high speed mixer while heating at about 70° C. to prepare a slurry. The slurry was repeatedly filtered and washed with water to remove sodium chloride and the solvent, followed by drying at 80° C. for 24 hours to prepare 198 parts of salt milled pigment (B-1). The specific surface area of salt milled pigment (B-1) was 93 $m^2/g$.

Production Example 5

190 parts of violet pigment PV 23 ("LINOL VIOLET RL", manufactured by Toyo Ink Mfg. Co.), 1600 parts of sodium chloride and 100 parts of diethyleneglycol were placed in a one-gallon stainless steel kneader, and the mixture was kneaded at 90° C. for 3 hours. This mixture was poured into 5 liters of warm water, and was stirred for about 1 hour with a high speed mixer while heating at about 70° C. to prepare a slurry. The slurry was repeatedly filtered and washed with water to remove sodium chloride and the solvent, followed by drying at 80° C. for 24 hours to obtain 198 parts of salt milled pigment (V-1). The specific surface area of salt milled pigment (V-1) was 104 $m^2/g$.

Production Example 6

200 parts of yellow pigment PY 138 ("PALIOTOL YELLOW K0961HD", manufactured by BASF Co.), 1500 parts of sodium chloride and 270 parts of diethyleneglycol were placed in a one-gallon stainless steel kneader, and the mixture was kneaded at 60° C. for 6 hours. This mixture was poured into 5 liters of warm water, and was stirred for about 1 hour with a high speed mixer while heating at about 70° C. to prepare a slurry. The slurry was repeatedly filtered and washed with water to remove sodium chloride and the solvent, followed by drying at 80° C. for 24 hours to prepare 196 parts of salt milled pigment (Y-1). The specific surface area of salt milled pigment (Y-1) was 100 $m^2/g$.

b) Preparation of Acrylic Resin Solution

Production Example A 800 parts of cyclohexanone was placed in a reaction vessel, and was heated at 100° C. while nitrogen gas was injected into the vessel. A mixture of the following monomers and thermal polymerization initiator was added dropwise to the solvent over 1 hour, effecting a polymerization reaction:

|  |  |
|---|---|
| Styrene | 60.0 parts |
| Methacrylic acid | 60.0 parts |
| Methyl methacrylate | 65.0 parts |
| Butyl methacrylate | 65.0 parts |
| Azobisisobutyronitrile | 10.0 parts |

After the addition, the reaction was continued at 100° C. for additional 3 hours, and then a solution of 2.0 parts of azobisisobutyronitrile dissolved in 50 parts of cyclohexanone was added. Then, the reaction was continued at 100° C. for additional 1 hour to prepare a resin solution. About 2 g of the resin solution was sampled after cooling the solution at room temperature, and was dried at 80° C. for 20 minutes and the amount of the non-volatiles was measured. Then, based on the measured value, cyclohexanone was added to the resin solution prepared above such that the non-volatiles became 20%, preparing a desired acrylic resin solution, which was used in the following Examples.

c) Preparation of Pigment Dispersion

Production Examples I to XII

The acrylic resin solution prepared in Production Example A was used together with the pigment and pigment derivative shown in Table 1, and a mixture having the composition (total of 100 parts) shown in Table 2 was uniformly mixed with stirring. Then, the mixture was dispersed with a sand mill using zirconia beads having a diameter of 1 mm for 5 hours and then filtered through a 5 μm filter to prepare red pigment dispersions RP-1 to RP-10, blue pigment dispersion BP-1 and green pigment dispersion GP-1.

TABLE 1

| Production Example | Pigment dispersion | Pigment used – First pigment | Pigment used – Second pigment | Pigment derivative added | Solvent added |
|---|---|---|---|---|---|
| I | RP-1 | R-1 (Red pigment A: 95%; pigment derivative: 5%) | — | D-1 | Cyclohexanone |
| II | RP-2 | R-2 (Red pigment A: 95%; pigment derivative: 5%) | — | D-2 | Cyclohexanone |
| III | RP-3 | R-3 (Red pigment A: 90%; pigment derivative: 10%) | — | D-1 | Cyclohexanone |
| IV | RP-4 | R-1 (Red pigment A: 95%; pigment derivative: 5%) | — | D-2 | Cyclohexanone |
| V | RP-5 | Unprocessed R1 | — | D-1 | Cyclohexanone |
| VI | RP-6 | Unprocessed R2 | Unprocessed Y | D-3 | Cyclohexanone |
| VII | RP-7 | R-3 (Red pigment A: 90%; pigment derivative: 10%) | Unprocessed R1 | D-1 | Cyclohexanone |
| VIII | RP-8 | R-1 (Red pigment A: 95%; pigment derivative: 5%) | Unprocessed R1 | D-1 | Cyclohexanone |
| IX | RP-9 | R-2 (Red pigment A: 95%; pigment derivative: 5%) | Unprocessed R2 | D-3 | Cyclohexanone |
| X | RP-10 | R-1 (Red pigment A: 95%; pigment derivative: 5%) | Unprocessed R1 | D-1 | Cyclohexanone |
| XI | BP-1 | B-1 | V-1 | D-4 | Cyclohexanone |
| XII | GP-1 | Unprocessed G | Y-1 | D-5 | Cyclohexanone |

TABLE 2

| Production Example | Pigment Dispersion | Composition (parts) – 1st Pig. | Composition (parts) – 2nd Pig. | Composition (parts) – Pigment derivative added | Composition (parts) – Acrylic resin solution | Composition (parts) – Solvent added | Amount of pigment derivative (parts) relative to 100 parts of red pigment A | Amount of red pigment B (parts) relative to 100 parts of red pigment A | Amount of pigment derivative (parts) relative to 100 parts of red pigments (A + B) |
|---|---|---|---|---|---|---|---|---|---|
| I | RP-1 | 10.8 | — | 1.2 | 40.0 | 48.0 | 17.0 | — | — |
| II | RP-2 | 10.8 | — | 1.2 | 40.0 | 48.0 | 17.0 | — | — |
| III | RP-3 | 11.2 | — | 0.8 | 40.0 | 48.0 | 19.0 | — | — |
| IV | RP-4 | 11.2 | — | 0.8 | 40.0 | 48.0 | 12.8 | — | — |
| V | RP-5 | 10.8 | | 1.2 | 40.0 | 48.0 | — | — | 11.1 (no pigment A) |
| VI | RP-6 | 7.8 | 3.6 | 0.6 | 40.0 | 48.0 | — | — | 7.7 (no pigment A) |
| VII | RP-7 | 7.8 | 3.4 | 0.8 | 40.0 | 48.0 | 22.5 | 48.4 | 15.2 |
| VIII | RP-8 | 8.2 | 3.2 | 0.6 | 40.0 | 48.0 | 13.0 | 41.1 | 9.2 |
| IX | RP-9 | 10.2 | 1.0 | 0.8 | 40.0 | 48.0 | 13.5 | 10.3 | 12.3 |
| X | RP-10 | 10.8 | 0.6 | 0.6 | 40.0 | 48.0 | 11.1 | 5.8 | 10.5 |
| XI | BP-1 | 9.6 | 0.4 | 2.0 | 40.0 | 48.0 | | | |
| XII | GP-1 | 7.9 | 5.8 | 1.8 | 36.5 | 48.0 | | | |

In Table 1, unprocessed R1 is PR 254 ("IGRAPHOR RED B-CF", manufactured by Ciba Specialty Chemical Co.; specific surface area of 80 m²/g), unprocessed R2 is PR 177 ("CHROMOPHTAL RED A2B", manufactured by Ciba Specialty Chemical Co.; specific surface area of 83 m²/g), unprocessed Y is PY139 ("PALIOTOL YELLOW D1819", manufactured by BASF Co.), and unprocessed G is PG36 ("LIONOL GREEN 6YK", manufactured by Toyo Ink Mfg. Co.).

The amount of the pigment derivative (parts) relative to 100 parts of red pigment A, the amount of red pigment B (parts) relative to 100 parts of red pigment A, and the amount of the pigment derivative (parts) relative to 100 parts of red pigment (A+B) were calculated and listed in Table 2 with respect to red pigment dispersions RP-1 to RP-10.

d) Preparation of Red-colored Film

Example 1

51.0 parts of pigment dispersion (RP-1), 1.0 parts of acrylic resin solution, 4.0 parts of trimethylolpropane triacrylate ("NK Ester ATMPT", manufactured by Shin-Nakamura Chemical Co.), 3.4 parts of a photopolymerization initiator ("Irgracure 907", manufactured by Ciba Specialty Chemicals Co.), 0.4 parts of a sensitizer ("EAB-F", manufactured by Hodogaya Chemical Co.) and 40.2 parts of cyclohexanone were mixed with stirring until homogeneous and the mixture was filtered through a 1 µm filter to prepare 100 parts of red-colored composition (RR-1). This red-colored composition (RR-1) was applied on a glass substrate by spin coating such that chromaticity x after curing became 0.63 (light source: C-light source). After drying the coated film at 70° C. for 20 minutes, the film was exposed to UV light using an extra-high pressure mercury vapor lamp. Then, the substrate was heat-treated at 230° C. for 1 hour to form a red-colored film.

Example 2

100 parts of red-colored composition (RR-2) was prepared and a red-colored film was formed, by the same method as in Example 1, except that pigment dispersion (RP-2) was used in place of pigment dispersion (RP-1).

Example 3

100 parts of red-colored composition (RR-3) was prepared and a red-colored film was formed, by the same method as in Example 1, except that pigment dispersion (RP-3) was used in place of pigment dispersion (RP-1).

Comparative Example 1

100 parts of red-colored composition (RR-4) was prepared and a red-colored film was formed, by the same method as in Example 1, except that pigment dispersion (RP-4) was used in place of pigment dispersion (RP-1).

Example 4

100 parts of red-colored composition (RR-5) was prepared and a red-colored film was formed, by the same method as in Example 1, except that pigment dispersion (RP-5) was used in place of pigment dispersion (RP-1).

Example 5

100 parts of red-colored composition (RR-6) was prepared and a red-colored film was formed, by the same method as in Example 1, except that pigment dispersion (RP-6) was used in place of pigment dispersion (RP-1).

Example 6

100 parts of red-colored composition (RR-7) was prepared and a red-colored film was formed, by the same method as in Example 1, except that pigment dispersion (RP-7) was used in place of pigment dispersion (RP-1).

Example 7

100 parts of red-colored composition (RR-8) was prepared and a red-colored film was formed, by the same method as in Example 1, except that pigment dispersion (RP-8) was used in place of pigment dispersion (RP-1).

Example 8

100 parts of red-colored composition (RR-9) was prepared and a red-colored film was formed, by the same method as in Example 1, except that pigment dispersion (RP-9) was used in place of pigment dispersion (RP-1).

Comparative Example 2

100 parts of red-colored composition (RR-10) was prepared and a red-colored film was formed, by the same method as in Example 1, except that pigment dispersion (RP-10) was used in place of pigment dispersion (RP-1).

e) Preparation of Blue-colored Film 42.0 parts of pigment dispersion (BP-1), 10.0 parts of acrylic resin solution, 5.6 parts of trimethylolpropane triacrylate, 2.0 parts of a photopolymerization initiator, 0.2 parts of a sensitizer and 40.2 parts of cyclohexanone were mixed with stirring until homogeneous, and filtered through a 1 µm filter to give blue-colored composition BR-1 (100 parts). The blue-colored composition BR-1 was applied on a glass substrate by spin coating such that chromaticity y after curing became 0.08 (light source: c-light source). After drying the coated film at 70° C. for 20 minutes, the film was exposed to UV light using an extra-high pressure mercury vapor lamp. Then, the substrate was heat-treated at 230° C. for 20 minutes to form a blue-colored film.

f) Preparation of Green-colored Film 52.0 parts of pigment dispersion (GP-1), 4.8 parts of trimethylolpropane triacrylate, 2.8 parts of a photopolymerization initiator, 0.2 parts of a sensitizer and 40.2 parts of cyclohexanone were mixed with stirring until homogeneous, and filtered through a 1 µm filter to give 100 parts of green-colored composition (GR-1). The green-colored composition (GR-1 was applied on a glass substrate by spin coating such that chromaticity y after curing became 0.58 (light source: c-light source). After drying the coated film at 70° C. for 20 minutes, the film was exposed to UV light using an extra-high pressure mercury vapor lamp. Then, the substrate was heat-treated at 230° C for 40 minutes to form a green-colored film.

The chromaticity, film thickness, contrast ratio and average amplitude transmittance ratio were measured with respect to the red-colored film obtained in Examples 1 to 8 and Comparative Examples 1 and 2, and the blue-colored film and the green-colored film. The results are shown in Table 3.

TABLE 3

| | Pigment dispersion | Colored composition | Chromaticity Y | x | y | Film thickness [μm] | Contrast ratio | Average amplitude transmittance ratio Normal line direction | 45° aslant direction |
|---|---|---|---|---|---|---|---|---|---|
| Ex. 1 | RP-1 | RR-1 | 22 | 0.64 | 0.33 | 1.8 | 2400 | 1.000 | 1.034 |
| Ex. 2 | RP-2 | RR-2 | 22 | 0.64 | 0.33 | 1.8 | 2300 | 1.000 | 1.035 |
| Ex. 3 | RP-3 | RR-3 | 22 | 0.64 | 0.32 | 1.8 | 3200 | 1.000 | 1.030 |
| Comp. Ex. 1 | RP-4 | RR-4 | 23 | 0.64 | 0.33 | 1.8 | 1800 | 1.000 | 1.045 |
| Ex. 4 | RP-5 | RR-5 | 21 | 0.64 | 0.33 | 1.9 | 1000 | 1.000 | 1.025 |
| Ex. 5 | RP-6 | RR-6 | 18 | 0.64 | 0.31 | 1.8 | 2000 | 1.000 | 1.033 |
| Ex. 6 | RP-7 | RR-7 | 21 | 0.64 | 0.32 | 1.8 | 1850 | 1.000 | 1.020 |
| Ex. 7 | RP-8 | RR-8 | 23 | 0.64 | 0.33 | 1.8 | 1400 | 1.000 | 1.025 |
| Ex. 8 | RP-9 | RR-9 | 20 | 0.64 | 0.31 | 1.8 | 1700 | 1.000 | 1.030 |
| Comp. Ex. 2 | RP-10 | RR-10 | 23 | 0.64 | 0.33 | 1.8 | 1700 | 1.000 | 1.044 |
| Blue colored film | BP-1 | BR-1 | 8 | 0.14 | 0.08 | 1.8 | 2600 | 1.000 | 1.010 |
| Green colored film | GP-1 | GR-1 | 60 | 0.30 | 0.58 | 1.8 | 2800 | 1.000 | 1.012 |

As shown in Table 3, the average amplitude transmittance ratio is in the range from 0.960 to 1.040 in the 45° aslant direction in the red-colored film of Examples 1 to 8 of the present invention. Since an unprocessed pigment with a specific surface area of less than 90 m²/g was used in Example 4 using pigment dispersion RP-5, the contrast ratio is a little lower value of less than 1800. Lightness was a little lower value of less than 20 in Example 5 using pigment dispersion RP-6 due to spectroscopic characteristics of the pigment.

On the other hand, the average amplitude transmittance ratio was in the range from 0.960 to 1.040 in the 45° aslant direction in the blue-colored film and green-colored film, and the value was closer to 1 than the red-colored film.

(g) Preparation of Color Filter and Production of Liquid Crystal Display Device

Example 9

First, red-colored composition RR-1 was applied by spin-coating on a glass substrate on which a black matrix has been formed in advance, and the coated film was dried at 70° C. for 20 minuets. The substrate was exposed to UV light from an extra-high pressure mercury vapor lamp through a photomask. After exposure, the exposed film was developed by spraying using an aqueous sodium carbonate solution at 23° C. The developed film was rinsed with ion-exchange water, and dried in air. Then, the film was heat-treated at 230° C. for 20 minutes to form a pattern of red stripes with a thickness of 1.8 μm.

Subsequently, a pattern of green stripes with a thickness of 1.8 μm was formed by the same method using green-colored composition GR-1. A pattern of blue stripes with a thickness of 1.8 μm was further formed by the same method using blue-colored composition BR-1 to form a color filter having red, green and blue filter segments.

A transparent ITO electrode layer was formed on the color filter obtained, and a polyimide orientation layer was formed thereon. A polarizer was formed on the other surface of the glass substrate. A TFT array and pixel electrode were formed on the surface of another (second) glass substrate, and a polarizer was formed on the other surface of the second substrate.

Two glass substrates thus prepared were made to oppose such that the electrodes were faced to one another, aligned while maintaining the space between the substrates constant using spacer beads, and the periphery of the substrates was sealed with a sealant so as to leave an opening port for injecting a liquid crystal composition. The liquid crystal composition was injected through the opening port, which was hermetically sealed thereafter. A further modularization was conducted, providing a liquid crystal display device LCD-1.

Example 10

Liquid crystal display device (LCD-2) was prepared by the same method as in Example 9, except that red-colored composition (RR-2) was used in place of red-colored composition (RR-1).

Example 11

Liquid crystal display device (LCD-3) was prepared by the same method as in Example 9, except that red-colored composition (RR-3) was used in place of red-colored composition (RR-1).

Comparative Example 3

Liquid crystal display device (LCD-4) was prepared by the same method as in Example 9, except that red-colored composition (RR-4) was used in place of red-colored composition (RR-1).

Example 12

Liquid crystal display device (LCD-5) was prepared by the same method as in Example 9, except that red-colored composition (RR-5) was used in place of red-colored composition (RR-1).

Example 13

Liquid crystal display device (LCD-6) was obtained by the same method as in Example 9, except that red-colored composition (RR-6) was used in place of red-colored composition (RR-1).

Example 14

Liquid crystal display device (LCD-7) was obtained by the same method as in Example 9, except that red-colored composition (RR-7) was used in place of red-colored composition (RR-1).

25

Example 15

Liquid crystal display device (LCD-8) was obtained by the same method as in Example 9, except that red-colored composition (RR-8) was used in place of red-colored composition (RR-1).

Example 16

Liquid crystal display device (LCD-9) was obtained by the same method as in Example 9, except that red-colored composition (RR-9) was used in place of red-colored composition (RR-1).

Comparative Example 4

Liquid crystal display device (LCD-10) was obtained by the same method as in Example 9, except that red-colored composition PR-10 was used in place of red-colored composition RR-1.

The liquid crystal display devices obtained in Examples 9 to 16 and Comparative Examples 3 and 4 were visually evaluated with respect to coloring on the black display screen. The results are shown in Table 4.

TABLE 4

| | Colored composition | | | Liquid crystal device | 45° aslant direction |
|---|---|---|---|---|---|
| | Red | Green | Blue | | |
| Ex. 9 | RR-1 | GR-1 | BR-1 | LCD-1 | ◯ |
| Ex. 10 | RR-2 | | | LCD-2 | ◯ |
| Ex. 11 | RR-3 | | | LCD-3 | ◯ |
| Comp. Ex. 3 | RR-4 | | | LCD-4 | X (red) |
| Ex. 12 | RR-5 | | | LCD-5 | ◯ |
| Ex. 13 | RR-6 | | | LCD-6 | ◯ |
| Ex. 14 | RR-7 | | | LCD-7 | ◯ |
| Ex. 15 | RR-8 | | | LCD-8 | ◯ |
| Ex. 16 | RR-9 | | | LCD-9 | ◯ |
| Comp. Ex. 4 | RR-10 | | | LCD-10 | X (red) |

As shown in Table 4, in the liquid crystal display devices of the present invention of Examples 9 to 16, no coloring was observed on the black display screen in the 45° aslant direction and display characteristics were excellent. On the other hand, in the liquid crystal display devices of Comparative Examples 3 and 4, coloring was observed on the black display screen in the 45° aslant direction, since pigment dispersions RP-4 and RP-10 having an average amplitude transmittance of larger than 1.040 in the 45° aslant direction were used.

As has been described above, the red-colored film of the present invention is excellent in visibility in aslant directions without any disturbance of polarized light, since the average amplitude transmittance ratio (av. tan Ψ) of the transmitted light, which is obtained by allowing elliptically polarized light incident from a 45° aslant direction to transmit through the film, in the wavelength range from 575 to 635 falls within a specified range. Accordingly, a high quality liquid crystal display device excellent in visibility in aslant directions may be obtained by using a color filter comprising the red-colored film of the present invention as a red filter segment.

26

Since the red-colored composition of the present invention contains two kinds of red pigment-particles having different specific surface areas to one another, distribution of the pigment particles is uniform. Consequently the red-colored film formed by using the red-colored composition of the present invention exhibits quite excellent visibility in an aslant direction without disturbing incident polarized light.

What is claimed is:

1. A red-colored film in which when an elliptically polarized light is incident on the film in a direction 45° aslant from a normal line direction with respect to a surface of the film, a light transmitted through the film has an average amplitude transmittance ratio (av. tan Ψ) in a wavelength region of 575 to 635 nm, which satisfies the following equation (1):

$$0.960 < av.\ \tan \Psi < 1.040 \qquad (1),$$

the red-colored film being formed from a red colored composition comprising a red pigment A which is a C.I. Pigment Red 254 having a BET specific surface area in the range from 90 to 140 m²/g, a red pigment B which is a C.I. Pigment Red 254 having a BET specific surface area in the range from 70 to 85 m²/g, and a pigment carrier comprising a transparent resin, a precursor of the transparent resin or a mixture of the transparent resin and precursor thereof, wherein the red pigment B is contained in an amount of 10 to 60 parts by weight relative to 100 parts by weight of the red pigment A.

2. The red-colored film according to claim 1, having chromaticity x of 0.62 or more as measured using C-light source prescribed by CIE standard, chromaticity y in the range from 0.30 to 0.35 when chromaticity x is 0.64, lightness Y of 20 or more, and a contrast ratio of 1800 or more in a normal line direction to the film surface.

3. A color filter comprising the red-colored film according to claim 1 as a red color filter segment.

4. A liquid crystal display device comprising the color filter according to claim 3.

5. A red colored composition comprising a red pigment A which is a C.I. Pigment Red 254 having a BET specific surface area in the range from 90 to 140 m²/g, red pigment B which is a C.I. Pigment Red 254 having a BET specific surface area in the range from 70 to 85 m²/g, and a pigment carrier comprising a transparent resin, a precursor of the transparent resin or a mixture of the transparent resin and the precursor thereof, wherein the red pigment B is contained in an amount of 10 to 60 parts by weight relative to 100 parts by weight of the red pigment A.

6. A red-colored film formed from the red-colored composition according to claim 5.

7. The red-colored film according to claim 6, having chromaticity x of 0.62 or more as measured using C-light source prescribed by CIE standard, chromaticity y in the range from 0.30 to 0.35 when chromaticity x is 0.64, lightness Y of 20 or more, and a contrast ratio of 1800 or more in a normal line direction to the film surface.

8. A color filter comprising the red-colored film according to claim 6 as a red color filter segment.

9. A liquid crystal display device comprising the color filter according to claim 8.

* * * * *